Dec. 8, 1942.  P. EISLER  2,304,558
CINEMATOGRAPHIC APPARATUS
Filed Aug. 11, 1939  4 Sheets-Sheet 1
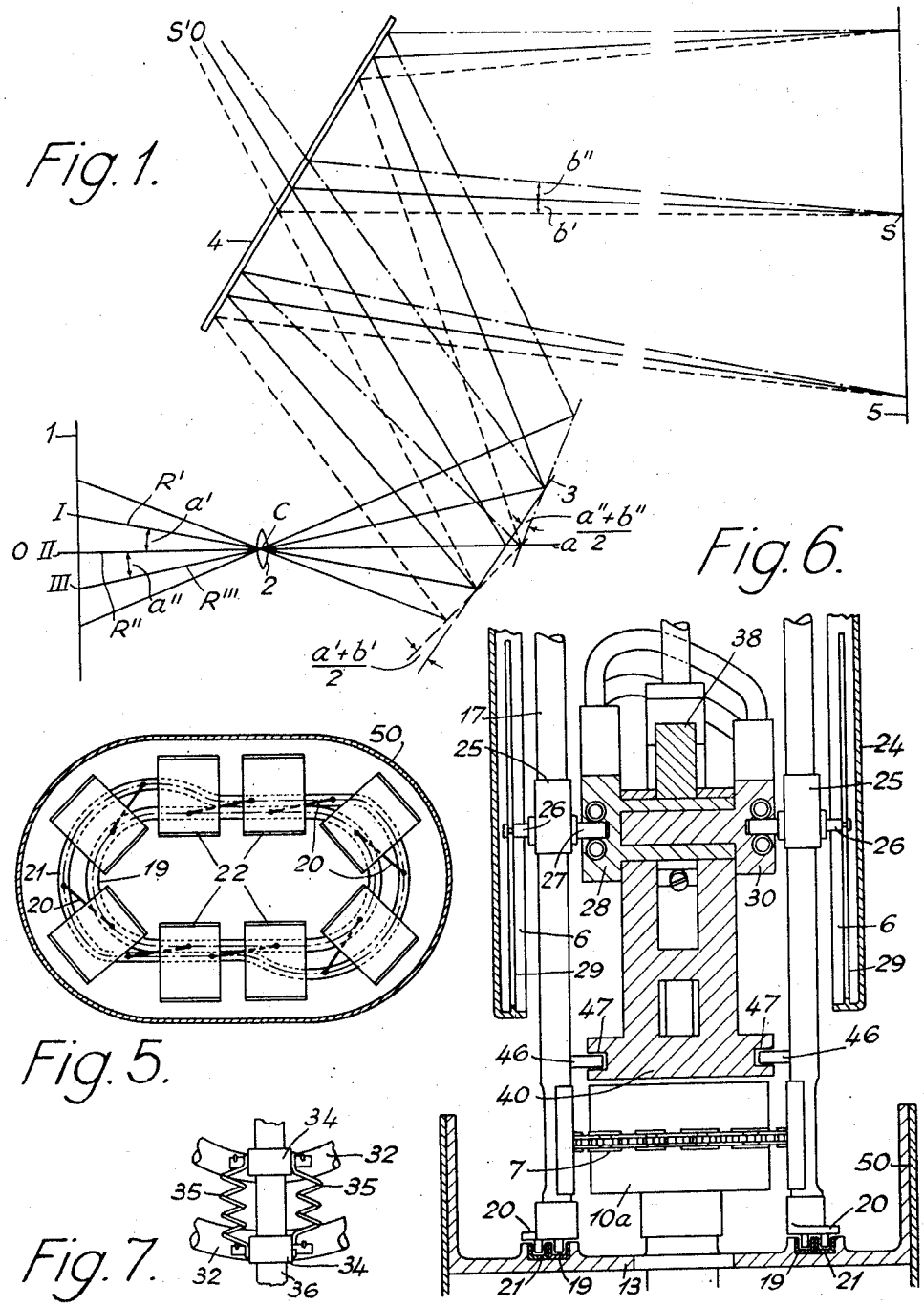
INVENTOR
Paul Eisler.
BY
ATTORNEYS Dec. 8, 1942.   P. EISLER   2,304,558
CINEMATOGRAPHIC APPARATUS
Filed Aug. 11, 1939   4 Sheets-Sheet 2
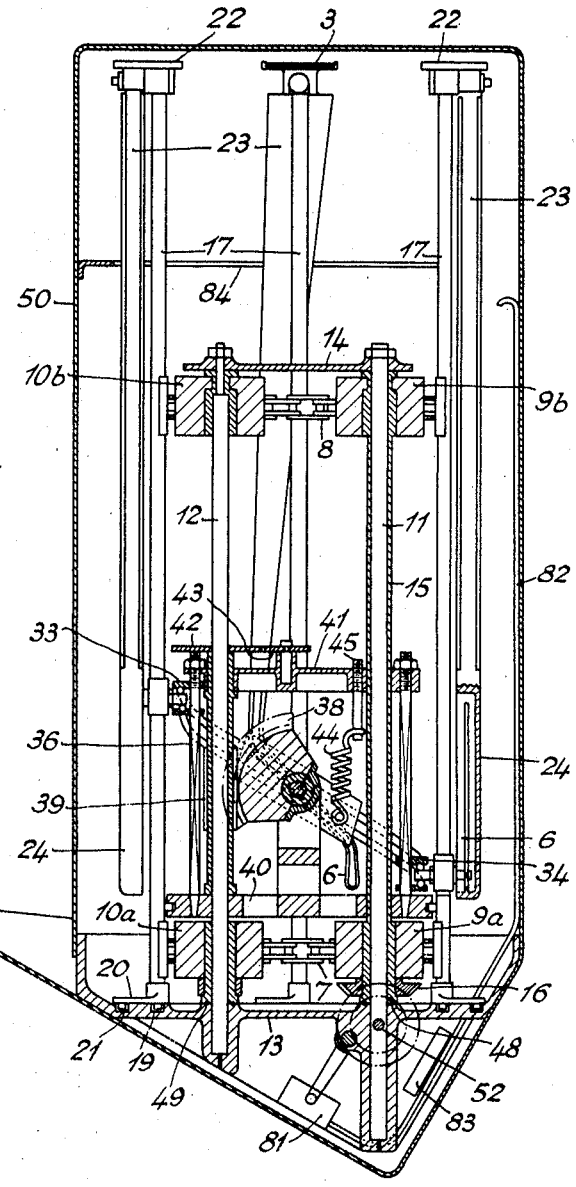
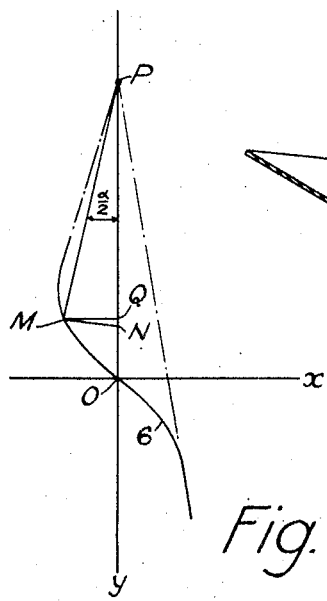
Fig. 3.
Fig. 2.
INVENTOR
Paul Eisler.
BY Young, Emery & Thompson
ATTORNEYS Dec. 8, 1942.                    P. EISLER                     2,304,558
                         CINEMATOGRAPHIC APPARATUS
                          Filed Aug. 11, 1939          4 Sheets-Sheet 4

INVENTOR
Paul Eisler.
BY
ATTORNEYS

Patented Dec. 8, 1942

2,304,558

UNITED STATES PATENT OFFICE 2,304,558

CINEMATOGRAPHIC APPARATUS

Paul Eisler, London, England

Application August 11, 1939, Serial No. 289,637
In Great Britain August 16, 1938

10 Claims. (Cl. 88—16.8)

This invention relates to cinematograph apparatus of the kind in which the film runs continuously through the gate and the beam is redirected by an optical compensator comprising one or more plane reflectors located wholly outside the objective system (i. e. the lens system which forms the projected real image each reflector being tilted about an axis in or near its surface and transverse to the direction of motion of the beam incident upon it in such a way as to bring the images of successive frames to rest on the screen.

The invention is of more particular use in projectors but it is applicable to cameras. Hereafter, for convenience conditions applying to projectors will be dealt with but the corresponding conditions applying to cameras will be understood by those skilled in the art.

The law which governs the tilting as a function of the movement of the film can be precisely determined from the conditions to be satisfied, but since the speed of operation and the degree of accuracy required are high the practical construction of a mechanism which will give and continue to give acceptable results presents a problem in itself and a further problem is to provide a mechanism which can readily be adapted to the particulars of different theatres and projectors (i. e. focal length of objective, required throw, screen size and film guides) and can be readjusted if these factors are changed because these factors without affecting the general law of tilting of the reflector, change the parameters of the law, more specifically they affect the amplitude of tilt.

Proposals have been made to provide adjustment of amplitude in apparatus of the kind in question by altering the effective radius of an arm actuating the reflector and in engagement with a cam. Such an adjustment will alter the amplitude but it will necessarily also alter the law of tilt since the radius of the path of the cam follower is changed; consequently only a very slight adjustment is possible if the stabilisation of the picture on the screen is not to be affected beyond acceptable limits and such schemes of adjustment are only suitable for dealing with minute variations such as shrinkage of film and are not adapted to deal with changes in focal length of objective and throw.

According to the present invention the tilting is effected by mechanism comprising members which determine the amplitude of tilt and other members which independently determine the law of tilt. As a result adjustment of the former can be provided within relatively wide limits without affecting the latter. Stated more specifically the mechanism has two portions one of which determines the amplitude of the tilt and the other determines the law of tilt irrespective of the amplitude. This can be done by using a first mechanism which affords a motion directly proportional to the travel of the film and determines the amplitude of tilt, i. e. a motion having a straight line law, and a second mechanism which converts the straight line law motion into a motion having the required law irrespective of the amplitude of the straight line law motion.

Such an arrangement has the advantage that one portion only of the whole mechanism needs any variation to deal with the different factors met with and above mentioned. That part can therefore readily be made adjustable so that the projector can finally be set by trial and so that it can be readjusted to compensate for a certain amount of wear.

A very convenient way of producing the straight law motion is by the coaction of an inclined straight guide and a follower; such a mechanism is adjustable for amplitude by altering the inclination of the guide. The reflector may be moved bodily through the beam, carrying with it the converting mechanism and the follower while the straight guide is stationary.

The converting mechanism described below is a cam mechanism which requires considerable accuracy in the making of the cam but is otherwise of very simple construction and has very few wearing parts.

An optical compensator as above described can work with but a single deflector. But then, since the reflector must return to starting point for every successive frame, a substantial, even though short, shutter interval must be allowed and in addition the mechanism is a purely oscillating mechanism with quick return which is not conducive to accuracy of motion nor to good wearing properties. I prefer therefore to make use of the feature known per se of providing a plurality of reflectors which traverse a closed path. Then there need be no substantial shutter interval or indeed any shutter interval at all; yet the return movement can be quite slow, in fact a multiple of the time of operative tilt. This scheme is very conveniently carried out with the use of a stationary straight guide as mentioned in the preceding paragraph.

The closed path of the reflectors may take any convenient shape and may be located in any convenient way in relation to the beam. Preferably it is a loop with parallel sides the reflectors constituting or being carried by one or more endless bands or chains running over drums with parallel axes. Further although it is generally more convenient to put the reflector between the objective and screen this is not absolutely essential and it could be between the film and objective.

Since in the present projector the film is moving during projection, the illuminated area at the gate must either travel with the film or be long enough to cover one frame height plus the distance travelled during the projection of a frame i. e. two frame heights in all if there is no shutter period. It is commercially quite easy to provide an illuminated area of two frame heights, but if this is done masking must also be provided for. This can in some cases be effected in the compensator itself. In others separate means must be employed, the simplest being a spiral slot in a rotating disc. If a travelling area has to be produced optical deviating means can be provided behind the film. Such can be akin to the compensator but that is in general unnecessarily complicated since the same accuracy is not required.

In the accompanying drawings

Figure 1 is a diagram illustrating the conditions to be fulfilled.

Figure 2 is a diagram illustrating the principles upon which one form of converting mechanism can be produced.

Figure 3 is a side view in section of a preferred construction based on Figure 2, the apparatus being shown tilted into a position which it does not normally occupy in use.

Figure 5 is a diagrammatic plan view of the apparatus shown in Figures 3 and 4 showing certain parts only.

Figure 6 is a detail section and Figure 7 a detail elevation, both taken at right angles to Figure 4.

Figure 4:
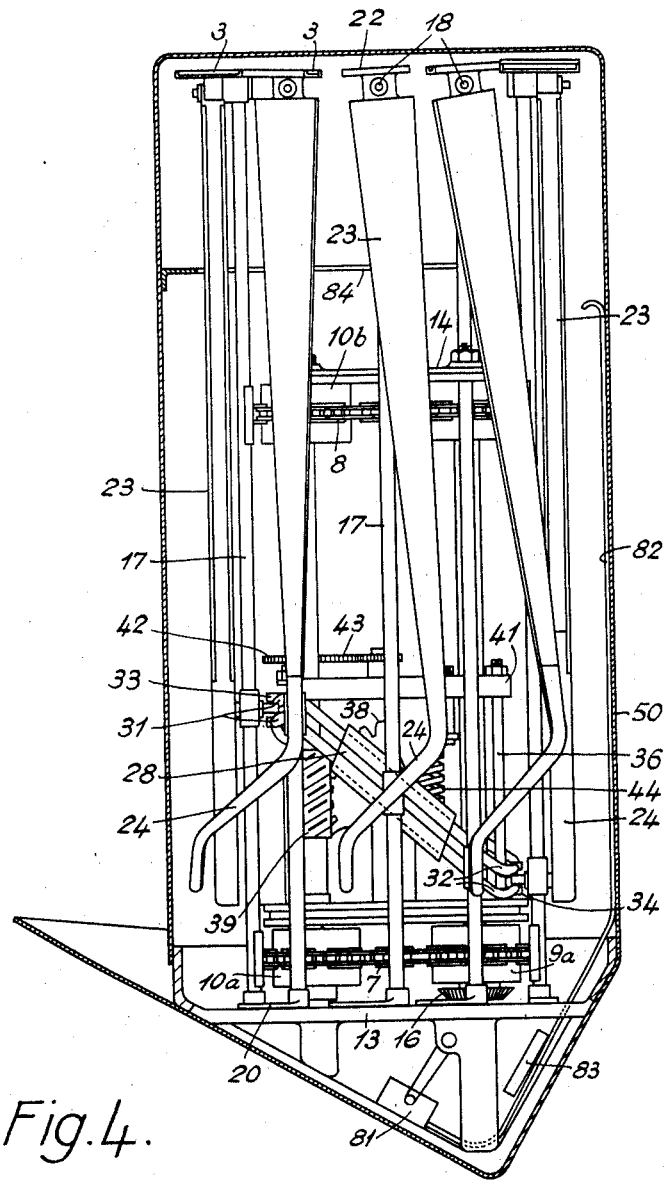
Figure 4 is a side view of the same from the same aspect.

Referring now to Figure 1 of the accompanying drawings which is an explanatory diagram, a film 1 illuminated in any suitable way from behind is moving steadily downwards and an image is projected by an objective 2 and a compensating reflector 3 on to a screen 5, a fixed reflector 4 being interposed for convenience in positioning and in avoiding inversion. The problem to be solved is to move the reflecting surface of the reflector 3 to bring the image on the screen to rest during the passage of one frame through substantially its own height (or proportionately less if shutter time is allowed).

I, II and III are three typical positions at different instants of a definite point on the film, say in the centre of a frame, position II being for convenience shown when the point is on the principal axis $o, a$ of the objective 2. At the first instant the ray $R^1$ from the point I through the centre C of the objective 2 makes angle $a^1$ to the axis $oa$ and is reflected by the reflector 3 which is in the dotted line position and thence as shown by a dotted line to a fixed reflector 4 and on to screen 5 at $s$. Other rays from point I need not be shown since it is to be supposed that the object is correctly focussed at least for this position. At another instant, say when position II is reached by the point on the film the ray $R^{11}$ from the point through the centre point C is along the axis $ca$ and is reflected by the reflector 3 which is now in the solid line position and thence as shown by a solid line to fixed reflector 4 again to point S on the screen 5. At a third instant, position III the ray $R^{111}$ through the centre C makes angle $a^{11}$ to the axis $oa$ and is reflected by the reflector 3 in its chain line position and as shown by a chain line to fixed reflector 4 again to point S on screen 5. Now the deflection produced by reflector 3 will be twice the angle of its normal to the axis ray and the angular change in deflection between any two positions will be twice the angle through which said angle changes i. e. through which the reflector in effect turns. If now while the ray moves through angle $a^1$ the reflector were to turn $a^1/2$ in the appropriate direction, the direction of the ray between 3 and 4 and therefore between 4 and 5 would remain constant i. e. the ray would remain parallel with itself. But since the point of incidence of the ray on reflector 3 shifts out of the axis $oa$ by a distance depending on the distance the point on the film moves multiplied approximately by the ratio of the distance between C and the reflector to the distance between C and the film, there would be substantially equal corresponding displacement of the point S on screen 5. To avoid this the reflector 3 must turn through a greater angle, the increase being half the angle $b^1$ required to turn the dotted line ray $R^1$ on to point C. Similarly for chain line ray $R^{111}$ the angle must be increased by $b^{11}/2$. The total $b$ part of the angle depends approximately on the shift above mentioned and the throw and in ordinary theatres is very small since the shift may be some three inches (depending on the distances between the film, objective and reflector 3) and the throw 100 or 150 feet. The relationship above developed is prefectly general and applies to every value of $a$ and $b$.

Now to keep the picture strictly in focus the distance from C to S must remain constant during the turning of reflector 3. So far as the compensation is concerned the reflector 4 can be neglected and the rays regarded as dealt with solely by reflector 3. If reflector 4 were omitted the point S would then be at $S^1$. Since the sum of the distances from C to reflector 3 and from reflector 3 to $S^1$ must be constant to keep the picture in focus the locus of the point at which the ray intersects reflector 3 should be an ellipse of which C and $S^1$ are the foci, but in practice no perceptible loss of sharpness will be suffered by letting the reflector 3 in effect swing on an axis intersecting $oa$ or indeed any axis in or close to the surface of the reflector and reasonably near the axis $oa$.

It remains to determine the rate of tilting of the reflector 3. For the preferred case shown in which the film gate is straight if $a$ is the angle of any ray through C to the axis $oa$ and $t$ is the time then obviously since the film is moving steadily the angle $a$ is changing so that its tangent is proportional to time. Since the reflector must produce an exactly similar motion but only has to swing through half the angle of deflection it must be tilted in such a way that the time taken to produce the corresponding tilt $a+b$ is proportional to tan $(a+b)$ in other words, any tilt angle must be reached in a time proportional to the tangent of twice the angle of tilt. If the film gate is curved the above relationship must be modified accordingly.

In general the objective 2 will be placed so that during projection any point on the film traverses a path which is of equal length above and below the axis $oa$; the maximum value of angle $a$ will accordingly also be the same above and below axis $oa$ but this symmetrical arrangement though usually the most convenient for obvious reasons, is not essential.

The principles of a cam converting mechanism giving the correct law of tilt irrespective of amplitude will now be described with reference to Figure 2. The reflector (not shown) is carried by a lever arm pivoted at P and actuated by an actuator which moves along a straight path PO and coacts with a cam curve 6 on the lever arm. For convenience the tilt of the arm will be measured with reference to the line PO and O will be chosen as the position of the actuator when the tilt is zero. This position corresponds with the instant when the angle $a$ of Figure 1 is zero.

The next step is either to choose the position of the actuator for a determined tilt or to choose a position on a line drawn at the determined tilt to the line PO as a point on the cam curve. In practice the former choice is more convenient. Let the position chosen be at N. With centre P and radius PN strike an arc NM subtending the predetermined tilt $$\frac{\alpha}{2}\left(=\frac{a+b}{2} \text{ of Figure 1}\right)$$

M is the desired point on the curve. M or N can be arbitrarily chosen but once one is chosen, the other and all other points on the curve are determined by a required motion.

The laying out of the curve may proceed as follows. The length ON is measured in the same units as PO and a constant $c$ evaluated such that $ON = c \tan \alpha$. For a series of values of $\alpha$ the values $c \tan \alpha$ are calculated and these distances marked up from O along OP. With P as centre corresponding arcs subtending the corresponding angles $$\frac{\alpha}{2}$$

are now drawn and their end points lie on the required curve.

It will be clear that as the actuator moves up from O towards P the lever arm will be tilted counter-clockwise and for any tilt angle $$\frac{\alpha}{2}$$

the actuator will have moved through a distance $c \tan \alpha$ i. e a distance proportional to the tangent of twice the angle of tilt. It is particularly pointed out that this is true for any displacement of the actuator so that it applies whatever the maximum displacement i. e whatever the maximum tilt. By moving the actuator at a steady speed at the proper ratio to that of the film the tilt will be effected in the manner laid down with reference to Figure 1.

The cam curve will of course need to be continued to the right of and below this point in Figure 2, the curve being plotted in the same manner. In a symmetrical arrangement the total angle of tilt will then be $\alpha$. The curve will be carried far enough to give the maximum value of $\alpha$ to be required in practice of the projector under design; this depending on the focal length of the objective and the throw. In actual design PO will be determined by mechanical considerations, among them that the longer PO is made the greater the angular accuracy for given limits of linear accuracy in the production of the cam curve.

The displacement of the actuator can most conveniently be effected by relative movement between the whole assembly described above and a straight guide on which the actuator rides. This relative movement may be perpendicular to the line PO and the straight guide will be inclined to the direction of movement, the inclination determining the rate of movement of the actuator in the line PO. In practice the guide will be stationary and the assembly moved relatively to it. It will be understood that adjustment of the guide must be about the point O unless a zero adjustment is provided between the actuator and reflector. In practical design the maximum tilt is decided and also the corresponding maximum inclination of the guide and the travel of the assembly during the picture period. From these factors $c$ can be determined in advance thus: If $\beta$ is the maximum inclination of the guide, $t$ the total travel of the assembly and O the mid point, during the travel to and from point O the displacement of the actuator will be $$\frac{t}{2} \tan \beta$$

But if $\alpha_{max}$ is the corresponding tilt, $$\frac{t}{2} \tan \beta = c \tan \alpha_{max}$$

whence $$c = \frac{t}{2} \cdot \frac{\tan \beta}{\tan \alpha_{max}}$$

Finally it may be more convenient in practice to lay out the cam curve by reference to rectangular coordinates, the $y$ axis of which may be PO and the origin O. The most convenient way of expressing $x$ and $y$ will be in terms of $\alpha$.

In Figure 2 MQ is perpendicular to PO so that $x = QM$ and $y = OQ$.

$$x = QM = PM \sin \frac{\alpha}{2}$$
$$= PN \sin \frac{\alpha}{2}$$
$$= (PO - ON) \sin \frac{\alpha}{2}$$
$$= (PO - c \tan \alpha) \sin \frac{\alpha}{2}$$
$$y = OQ = PO - PQ$$
$$= PO - PN \cos \frac{\alpha}{2}$$
$$= PO - (PO - ON) \cos \frac{\alpha}{2}$$
$$= PO - \cos \frac{\alpha}{2}(PO - c \tan \alpha)$$

The parts of the curve above and below O are obtained by plotting for positive and negative values of $\alpha$.

Figure 10:
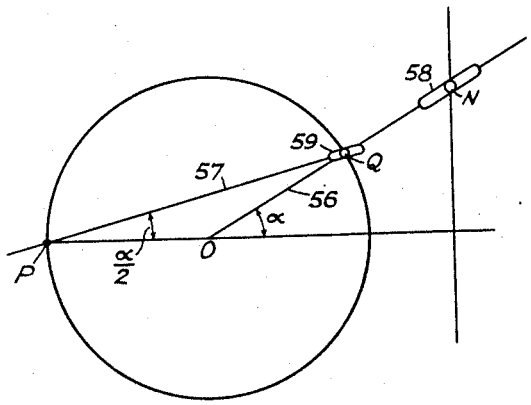
Fig. 10 is a diagram illustrating the principles of apparatus by which the cam curve of Fig. 2 can be generated.

The cam curve can also be generated by a mechanism based on the principles of Figure 10 described below.

Figures 3–7 illustrate a practical mechanism working on the principles of Figure 2, making use of a plurality of reflectors traversing a closed path, for the reasons above explained, each reflector together with the associated converting mechanism moving bodily past a stationary guide. As an example the reflectors move in a closed loop path which is in the plane described by their pivotal axes and this plane is set at an angle to the axis of the light beam from the projector so that the reflectors themselves can be in this plane or at a small angle to it when in mid tilted position. Such a path of the reflectors enables long lever arms to be used without difficulty, which in turn permits accuracy without excessively small manufacturing tolerances. Further the mechanism enables a high accuracy to be maintained because the number of points at which wear leading to error can occur is very small and readjustment is easy. It is moreover least likely to be subject to vibration since apart from other features contributing to that effect the compensator is isolated from the rest of the projector except for a chain required to keep the film and compensator in synchronism and no centrifugal forces act on the reflectors while they are in action. Finally the parts are very easy of access and replacement.

In this arrangement there is a pair of endless chains 7, 8 which run on sprockets 9a and 9b and 10a and 10b borne on respective stationary shafts 11, 12 held by base 13 and connected at the top by a plate 14. The sprockets 9a and 9b are connected together by a hollow shaft 15 which is driven through bevel gearing 16, Figure 3, from a shaft 52. Secured to the chains at equal intervals are a series of (eight in the example) preferably tubular pillars 17 which at their upper ends carry pivots 18 for the reflectors 3. To keep the pillars strictly to the correct path notwithstanding such factors as the flexibility of the chains their lower ends are guided in a guide groove 19 in the base 13. Twisting of the pillars on their own axes is prevented by brackets 20 carrying pins working in a second guide groove 21 in the base; this groove is shaped to provide a smooth path with as little disturbance as possible when the pillars leave and enter the straight part of the path. Pivoted on each pivot 18 is a holder 22 for a flat reflector 3 to which is attached a long lever 23. The main part of this lever may be constituted by two parallel sheet metal members to provide a light lever with maximum stiffness especially in the plane of oscillation to avoid vibration in this plane. The shape of the sheet metal members may be such as to impart a moment of resistance in the plane of swing substantially proportional to load. At its lower end each lever carries a cam member 24 in which is provided a cam slot 6. This construction results in a lever which will not have any natural mode of vibration synchronising with the motions imparted to it by the mechanism. The slot 6 is shaped as above described with reference to Figure 2 and needs to be produced with a high degree of accuracy. But the required accuracy is within commercially feasible limits; moreover as explained above one form of cam slot suits any required angle of oscillation up to the limit of oscillation to be provided for.

The tilting is effected by the aid of a slide block 25 (constituting the actuator of Figure 2) sliding on each pillar 17 and having a pin 26 working in slot 6 and another pin 27 working in a normally fixed inclined guide 28 which at least over the active part of the movement of the reflectors is straight. Actually with the proportions shown above this guide is straight well beyond each end of the said active part which has the advantage that when this active part begins and ends there is little or no acceleration of the oscillating parts. The guide 28 causes the block 25 to slide on the pillar and the consequent movement of the pin 26 in slot 6 causes the lever to swing. The tilt of the guide is adjustable to alter the swing of the lever by means described below. The lever may be prevented from flexing transversely and causing the slots 6 and pin 26 to disengage by a groove in the latter in which ribs 29 in the member 24 loosely engage. Since the guide imparts a motion to the block which in the position for maximum tilt is greater than necessary for the active tilt, the cam slot 6 must be extended at the ends beyond its active part. So that this excess motion may impart as little extra swing as possible, beyond a smooth transition curve, these extended parts of slot 6 are made radial to the pivot 18 (see Figure 2).

The pin 27 must of course be guided throughout the circuit. To effect this while permitting adjustment of the tilt of the guide 28, the part of the circuit opposite guide 28 is dealt with by another conveniently straight guide 30 secured to the guide 28 so that it tilts with it while the end loops are constituted by pairs of bent tubes or rods 31, 32. The latter can telescope in the guides 28, 30 and their outermost parts are held in blocks 33, 34 urged together by springs 35 (see Figure 7) and sliding on guide bars 36; in addition the tubes or rods can be notched adjacent the guides 28, 30, to localise the flexing they must suffer during adjustment. During adjustment they substantially maintain their shape in plan so as to retain their engagement with pins 27. They are preferably shaped so that their respective uppermost and lower most points are not on the mid axis in plan, but (see Figure 6) are nearer the side of guide 28 so that the period of return movement of the block 25 is greater than its period of active movement. In this way the likelihood of setting up vibration synchronizing with the natural period of any part of the apparatus is reduced. Further the inclination of guide 30 can be less than that of guide 28 which is of importance at the maximum inclination because the levers on the return part of their movement are swung together by the action of guide 30.

The two guides are swung together when adjustment is made. To permit precise adjustment the guide assembly is provided with a toothed sector 38 coacting with a worm 39 borne on the stationary shaft 12 and located endwise between a guide base 40 and guide top plate 41. The guides 28 and 30 are pivotally carried by the base 40. The worm 39 carries a gear wheel 42 above plate 41, with which gears another wheel 43 which can be rotated for adjustment by the aid of a long screw driver or the like. Play in the worm gear is taken up by a strong spring 44 loading of which can be adjusted by a screwed spindle 45.

To prevent any vertical vibrations from interfering with the accuracy of oscillation of the reflectors, the guide assembly is slidable on the shafts 11, 12 i. e. parallel to the sprocket axes and is located vertically by pins 46 (Figure 6) and the pillars 17 engaging in a groove 47 in the edge of the guide base 40. The weight coming on the sprockets 9a, 10a is taken by ball bearings 48, 49.

A factor governing the maximum possible tilt of the levers is that one lever must not touch those adjacent anywhere round the circuit. With the general proportions shown, the guide 28 may be tilted up to about 40° giving a lever oscillation of about 6° which is the maximum required in any ordinary case. At the back the guide 30 needs to be at an angle of about 10° less than the front guide to which it is attached and with which it tilts as above explained.

Figure 8:
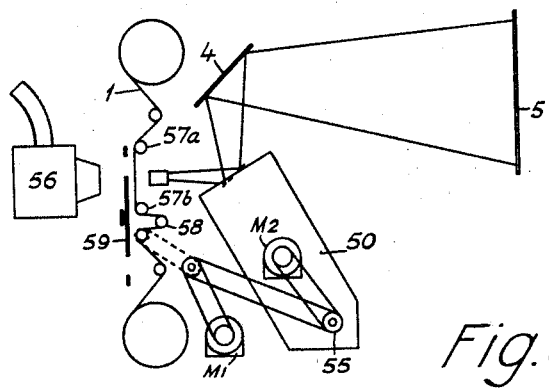
Fig. 8 is a diagrammatic view of a complete projector embodying the compensator of Figs. 3 to 7.

The whole mechanism is enclosed in a casing 50 which although shown in Figures 3, 4 and 6 with the pillars 17, etc., vertical, is provided with a base such that it stands on the floor at a suitable angle as may be seen in Figure 8. The casing is made oil tight and by using the lower part as an oil sump, an oil bath is provided for the lower chain and moving parts and the pin and slot mechanism. An oil pump 81 driven from the shaft 52 may discharge oil through a pipe 82 upon the upper chain and upper sprocket bearings. An inspection window or gauge 83 will enable the oil level to be observed. Oil is kept away from the reflectors by using long pillars 17 as shown so that they are well above the oil level; moreover the tilting of the whole brings them somewhat to one side of the oil sump. In addition a baffle plate or plates 84 may be provided just below the reflectors. A sufficient opening is provided in the top of the case for the reflectors to perform their function.

The whole mechanism is driven through the shaft 52 which carries one member of the bevel gearing 16. As it must synchronize with the film feed, a chain may be used for this purpose running on a sprocket 55 (Figure 8) on shaft 52. The usual motor M₁ on the projector which may be a synchronous or quasi-synchronous motor may not be powerful enough to drive the reflector mechanism. Conveniently therefore, a non-synchronous motor M₂ may be coupled or geared to the shaft 52 which motor at its normal running speed would drive the shaft a little too fast. This motor then drives the compensator and through the coupling chain also tends to drive the projector film feed and the synchronous motor becomes at least in part a speed regulator.

Figure 9:
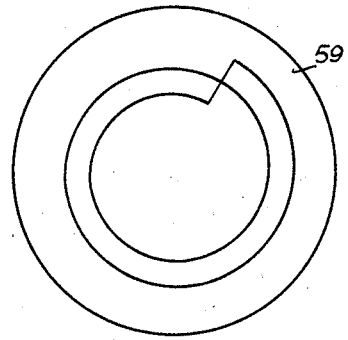
Fig. 9 is a front view of the masking disc of Fig. 8.

The essentials of a complete projector provided with the compensator just described are shown in Figure 8. The compensator casing is at 50. The film is illuminated from a lamphouse 56 assumed capable of illuminating two frame heights. The film 1 is fed by sprockets 57a, 57b while suitable means such as a differential gear drive of these sprockets, or an adjustable roller 58 enables framing to be corrected. The picture is masked by the aid of a disc 59 located behind the film. This disc (see Figure 9) has one or more spiral slots in it each one frame in depth, and the pitch, number of slots and gearing of the disc are designed so that the picture is correctly masked. In the example shown the path of the reflectors is at about 30° and their mid tilt angle at about 45° to the optical axis but these figures can be varied to suit convenience in any particular case.

In Fig. 8 a lever 56 pivoted at O has a radially slidable engagement with an actuator moving in a straight path, and a lever arm 57 is pivoted at P and has radially slidable engagement with a fixed point on lever 56, the distance PO being equal to the distance from O to the fixed point on the lever 56 and the line PO being perpendicular to the path of the actuator. By radially slidable engagement I mean that the engagement allows relative radial movement between the member having engagement and the member engaged; a slot embracing a pin is a typical example and is shown in the drawings in which lever 56 is slotted at 58 to embrace a pin N on the actuator and lever 57 is slotted at 59 to embrace a pin Q on the lever 56. The tilt angle must in this case be measured with reference to PO which is equivalent of oa in Figure 1, and the displacement of the actuator must be measured from the intersection of its path with PO.

Now owing to the path of the actuator and to the radially slidable arrangement at 58, the tangent of angle α is proportional to the displacement of the actuator. Further owing to the fact that PO=OQ a circle with centre O and radius OP will pass through P and Q so that the angle of tilt of the arm 57 will always be half the angle. Therefore if the actuator moves steadily and at the proper rate the arm 57 will be tilted according to the law laid down with reference to Figure 1.

By providing the points P.O on the table of a vertical milling machine whose feed is in the direction PO, the point N on a table movable on the first table in a direction perpendicular to PO, gearing the table feeds together (generally with a ratio of 1:1) extending member PQ to the right and using it to carry the workpiece, an end milling cutter located in the line PQ will generate the cam curve required for a mechanism arranged on the principles of Figure 2.

I declare that what I claim is:

1. In a cinematograph compensator for a continuously moving film, the combination of a support, a reflector pivoted thereto, an arm on said reflector, a cam on said arm shaped according to the formula $$x = (PO - c \tan \alpha) \sin \frac{\alpha}{2}$$

and $$y = PO - \cos \frac{\alpha}{2}(PO - c \tan \alpha)$$

the $x$ and $y$ axes lying in a plane perpendicular to the pivot of said reflector, the $y$ axis passing through said pivot and the $x$ axis being at right angles to and intersecting the $y$ axis at a distance equal to PO from said pivot; $c$ being a constant and $\alpha$ a variable, an actuator engaging said cam, and means for displacing said actuator along the $y$ axis with a displacement bearing a linear relation to time.

2. In a cinematograph compensator for a continuously moving film, the combination of a straight line guide, a carrier, an actuator supported on said carrier so as to be slidable in a straight line path thereon, a reflector pivoted on said carrier, means for moving said carrier in a straight path so set in relation to said guide that said actuator engages said guide and is thereby caused to execute a movement on its path on said carrier, and cam means operated by said actuator for tilting said reflector in accordance with the required law of compensation.

3. In a cinematograph compensator for a continuously moving film the combination of an endless band, means for driving said band in a path including a straight portion, a plurality of pillars carried by said band, a lever arm pivoted to each said pillar, a reflector carried by each said arm, a cam on each said arm, an actuator slidably supported by each said pillar and thereby adapted to coact with the corresponding cam, a straight guide in the path of said actuators inclined to the direction of travel of said pillars and located to slide the actuators in relation to their pillars in turn at the time the corresponding reflector is moving through the straight portion of the path of said band.

4. In a cinematograph compensator of the tilting reflector type for a continuously moving film the combination of a pair of drum members on parallel axes, an endless band looped over said drum members in driving engagement therewith, means for rotating one of said drum members, a plurality of pillars carried by said band parallel with the axes of said drum members, an arm pivoted to said pillar, a reflector carried by each said arm, a cam on each said arm, an actuator slidable on each said pillar, and thereby adapted to coact with the corresponding cam, and guide means engaging each said actuator during the whole of its travel with the pillar, said guide means including a straight part which slides the actuator on its pillar.

5. In a cinematograph compensator of the tilting reflector type for a continuously moving film the combination of a pillar, means for carrying said pillar in a closed parallel sided looped path, a reflector pivoted to said pillar, an actuator slidable on said pillar, means for tilting said reflector operated by sliding of said actuator on said pillar, guide means for said actuator controlling its sliding on said pillar throughout the movement of said pillar, said guide means including two straight portions corresponding with the straight sides of said looped part but inclined to the plane thereof and two smooth curved portions joining the ends of said straight portions.

6. A compensator as set forth in claim 5 wherein said straight portions are of unequal lengths and are at different inclinations to said plane.

7. A compensator as set forth in claim 5 also including spring loaded worm gear for adjusting the inclination of both said straight portions equally and simultaneously.

8. A compensator as set forth in claim 5 wherein said straight portions comprise grooved members and said curved portions each comprise a pair of flexible members telescoping into the ends of said grooved members and spaced so that the space between them continues the grooves in said grooved members, and also including a pin on said actuator projecting into said groove.

9. A compensator as set forth in claim 5 wherein said straight portions comprise grooved members and said curved portions each comprise a pair of flexible members telescoping into the ends of said grooved members, and spaced so that the space between them continues the grooves in said grooved members, and also including means on said pillar controlling the portion of said guide means in endwise relation to the pillar.

10. A compensator as set forth in claim 5 wherein said band comprises a pair of chain elements spaced apart axially and also including an external casing serving as an oil bath, said pillars being of sufficient length to hold said reflectors out of reach of oil.

PAUL EISLER.